Aug. 7, 1945.  L. J. VANKE  2,381,390
AUTOMOBILE SPEED WARNING DEVICE
Filed April 5, 1943  2 Sheets-Sheet 1
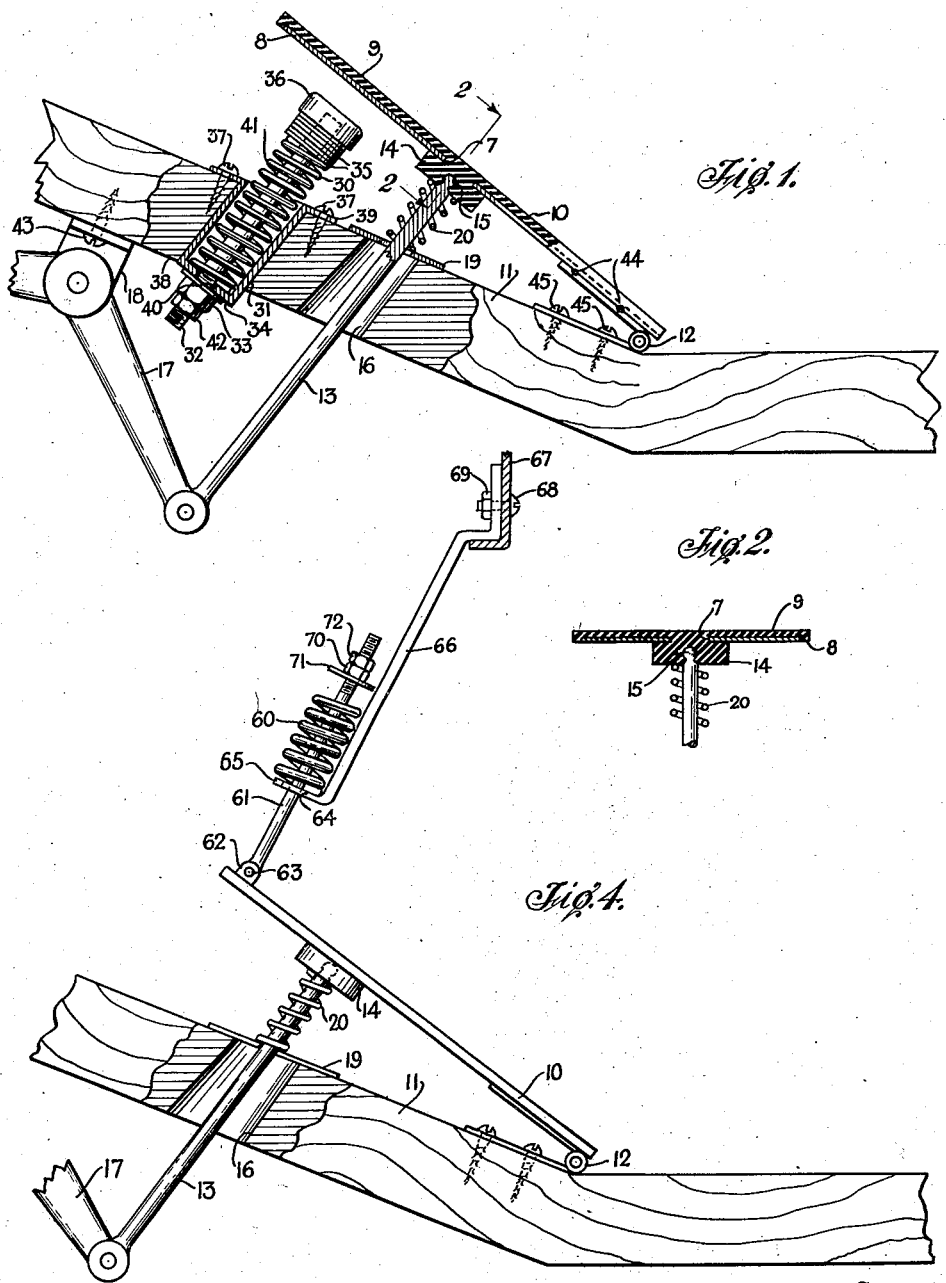
Inventor
LOUIS JOSEPH VANKE
By Ely & Frye
Attorney Aug. 7, 1945. L. J. VANKE 2,381,390
AUTOMOBILE SPEED WARNING DEVICE
Filed April 5, 1943 2 Sheets-Sheet 2

Inventor
LOUIS JOSEPH VANKE
By Ely & Frye
Attorneys

Patented Aug. 7, 1945

2,381,390

UNITED STATES PATENT OFFICE 2,381,390

AUTOMOBILE SPEED WARNING DEVICE

Louis Joseph Vanke, Akron, Ohio, assignor to The Firestone Tire & Rubber Company, Akron, Ohio, a corporation of Ohio Application April 5, 1943, Serial No. 481,939

3 Claims. (Cl. 74—526)

The present invention relates to an automobile speed warning device.

An object of the invention is to provide mechanism which may be combined with the conventional accelerator pedal and associated apparatus of automobiles whereby a driver will be warned by the resistance against the downward movement of the accelerator pedal that the throttle has been opened a previously determined amount while, at the same time, the pedal is operable in the usual manner to progressively open the throttle to its wide-open position.

By reference to the drawings, it will be seen that the mechanism consists generally of the usual accelerator pedal with springs associated with the pedal, and arms actuated by the pedal in such manner that in the initial opening of the gas feed throttle and through its opening operation, up to a predetermined point, only one spring is involved, while at such point one or more additional springs become involved. Thus the operator, pressing the pedal downwardly with his foot, feels the contact of the additional spring resistance and knows at once that the throttle has been opened to the predetermined amount, at which position the operator can conveniently hold the throttle by resting the weight of his foot on the pedal against the resistance of the newly involved auxiliary spring or springs. However, should the operator desire to open the throttle farther, he simply presses his foot down on the accelerator pedal exactly as he has been in the habit of doing except a definite step-up of foot pressure is required. It will also be seen that means are provided whereby the degree of opening of the throttle where the auxiliary springs become involved may be varied to such throttle setting as normally would be required to drive the car at a speed of, for example, 25, 35 or 45 miles per hour.

These and other objects and advantages of the invention will be understood by those familiar with the art and by reference to the accompanying drawings wherein:

Fig. 1 is a fragmentary side elevation partly in section showing the relative position of the accelerator pedal, arms, floor board, springs, etc., involving the present invention, shown in the position they occupy when the pedal is in its upper position;

Fig. 2 is a cross sectional view taken on line 2—2 of Fig. 1;

Figure 3:
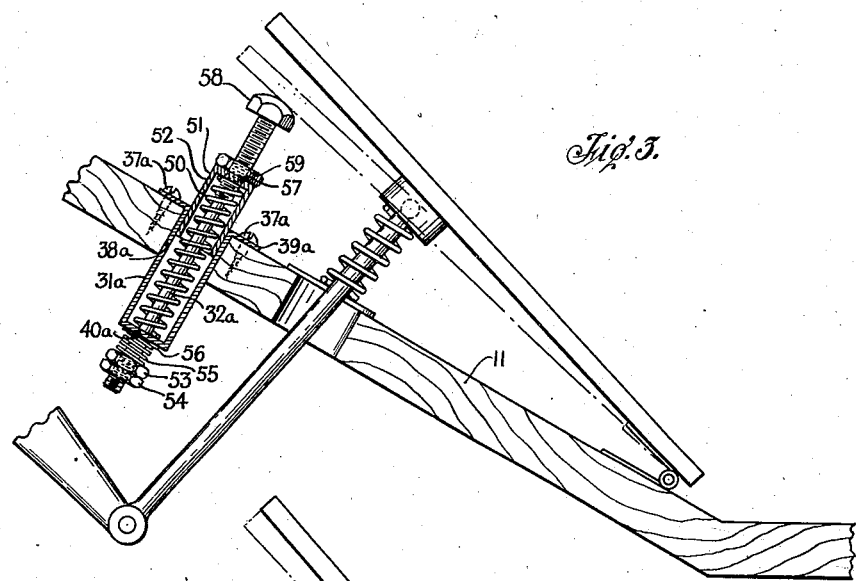
Figure 5:
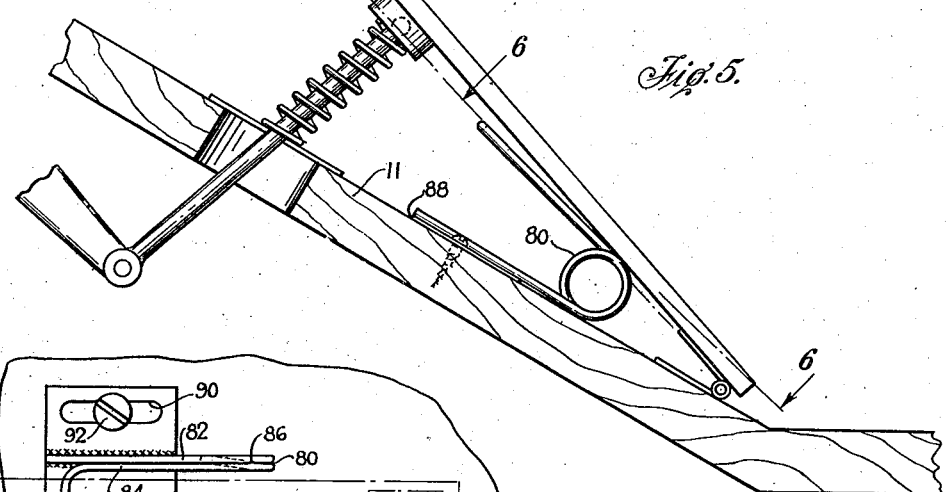
Figure 6:
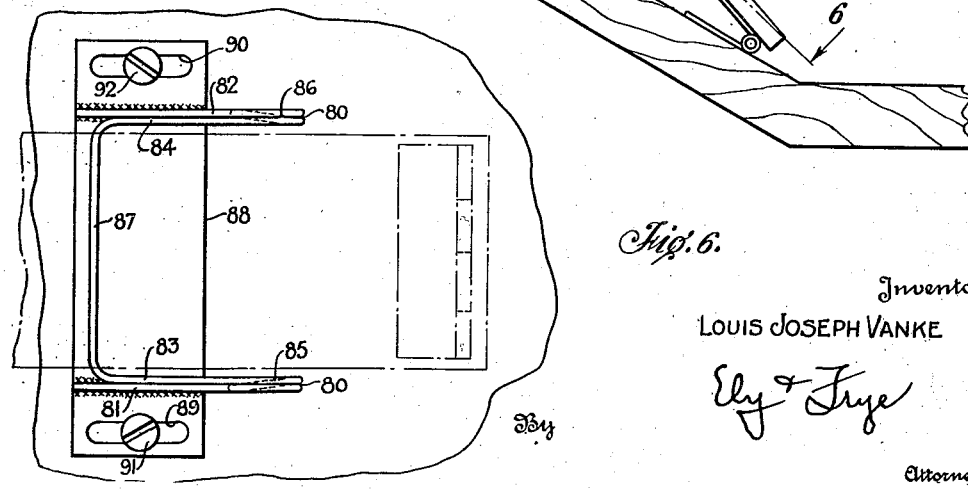

Figs. 3, 4, and 5 are similar to Fig. 1, but each showing a modified form thereof;

Fig. 6 is a view taken on line 6—6 of Fig. 5.

Referring now to the details of Fig. 1 it will be seen that the invention, in the embodiment there illustrated, comprises an accelerator pedal 10 attached to a floor board 11 by a hinge 12. The pedal 10 is composed of rubber in the form of a layer 9 applied to a metal reinforcing plate 8. A hole 7 through plate 8 permits the said layer of rubber to extend to the opposite or under side of the pedal and to be formed into a bearing 14 of a ball and socket joint. The pedal and said bearing are molded in one piece as will be understood by those familiar with the art of molding mechanical rubber goods. One leaf of the hinge 12 is attached to the pedal by being spot welded to the plate 8 by welding 44, and the other leaf is attached to the floor board by means of screws 45. A rod 13 is attached to the under side of said pedal by means of said ball and socket joint, the ball 15 of said joint being formed on the end of the rod 13. The rod 13 passes through a hole 16 formed in the floor board and is pivotally connected to the free end of a bell arm 17, which arm is itself pivotally supported by a bracket 18 that is attached to the under side of the floor board 11 by screws, such as the screw 43. A washer 19 bridges said hole 16 and forms a loose fit about the arm 13. A coil spring 20 is carried on said arm 13 between the bearing 14 and the washer 19 and normally is maintained under compression thereby. It is to be noted that the spring 20 is always in operation either in supporting the pedal 10 when the accelerator mechanism is not operative or in a more compressed condition during the downward and upward travel of the pedal. An auxiliary coil spring assembly 30 is mounted in the floor board 10 and projects upwardly therefrom a predetermined distance. Said assembly 30 consists of a cup-like socket member 31, open at its upper end and closed at its lower end, said open upper end being formed with an outwardly turned flange 39. Said member 31 is received in a hole 38 formed in the floor board 11, said flange 39 resting upon the upper surface of said floor board and having screw holes which receive screws 37 whereby the member 31 is attached to the floor board of the automobile. The member 31 may be composed of any material found satisfactory, such as metal, and its closed end has a center opening 40 which receives in slidable relation, a rod 32. The rod 32 projects downwardly through said hole 40, its projecting end being threaded and having a nut 33 and a lock nut 42 threaded thereon and a washer 34 between the nut 33 and the member 31. The rod 32 has an unthreaded body portion terminating in a head portion 36 which may be either an upset head or a separate head attached to the rod in any manner found satisfactory, as for example, the head and rod may form a ball and socket joint. A coil spring 41 is carried by the rod 32, the lower end of this spring seating against the bottom of the socket member 31 and the top against the head 36 or against the lowermost of one or more adapter or control washers 35, the washers 35 being mounted on the rod 32. The relationship between springs 20 and 41 is preferably such that the latter is heavier and has a higher rate, thus requiring the operator to exert greater pressure on the pedal to compress spring 41, than is required to compress spring 20.

It will be seen by reference to Fig. 1 that the head 36 is spaced a distance below the pedal 10 when the pedal is in its uppermost position, which is the position it occupies when the motor of the automobile is running at idling speed. It will also be seen that the spacing between the pedal 10 and the head 36 may be adjusted within the expanding and contracting range of the spring 41 by running the nut 33 forward or backward on the rod 32. This movement of the nut 33 will affect the compression of the spring 41 and accordingly removable washers 35 are provided on the rod 32 between the spring 41 and the head 36. One or more of the washers 35 may be added or removed to increase or decrease the amount of compression to which the spring 41 is subjected when the nut 32 is in any given position.

The operation of the above described mechanism is as follows:

When no gasoline is being fed or when the vehicle motor is idling, the pedal 10 occupies the position in spaced relation to the head 36 illustrated in Fig. 1, the pedal being supported against the spring 20. To increase the feed of gasoline to the carburetor of the vehicle the driver presses the pedal downwardly. As the pedal is pressed downwardly, a throttle in the gasoline feed line is progressively increasingly opened as is commonly understood by those familiar with the art. As the pressure against the pedal is removed the spring 20 returns the pedal to its upper position as is also commonly understood. Thus there is a definite relation between the position the pedal 10 occupies and the gasoline feed and thereby the speed at which the automobile travels. The practice of the driving public, in the present national emergency, of keeping the speed of their automobiles at thirty-five miles an hour or less, has presented drivers with a problem principally because they are not accustomed to judging the thirty-five miles an hour speed of their automobiles, and because automobiles, as now constructed, will quickly and easily attain a speed greater than thirty-five miles an hour. Consequently, before the present invention, drivers necessarily had to consult the speedometer of their cars in order to approximate the desired speed. In Fig. 1 the head 36 in its upper position is spaced from the pedal 10 a distance such that when said pedal, being pressed downwardly by the driver, contacts said head, the throttle of the automobile will be opened sufficiently to supply the amount of gasoline necessary to drive the car at a predetermined speed as, for example, thirty-five miles an hour. Head 36 thus acts as a stop that yieldingly limits the downward movement of the accelerator pedal against the light pressure of spring 20 at the maximum speed position in the normal driving range. After the pedal 10 contacts the head 36 any further downward movement of the pedal must also press the said head downwardly which involves the compressing of the heavier spring 41. This, of course, requires the exerting of substantially greater foot pressure by the driver and he accordingly knows at once that he has exceeded the maximum speed, such as thirty-five miles per hour, at which he should normally drive the automobile. Of course, it is much easier for a driver to judge the speed of his car from a given speed over a narrow range of speed than it is to judge the speed from starting speed to thirty-five miles per hour. If the driver, after he feels the spring 41 come into action, wishes to feed more gasoline, he simple presses downwardly on the pedal exactly as the pedal has normally been operated before the present mechanism was employed, and in this manner the throttle may be opened to its wide-open position. To close the throttle from a wide open position the operator may gradually lessen the downward pressure on the pedal 10 when the springs 20 and 41 will expand, pushing the said pedal upwardly until the head 36 reaches its upper limit when the upward pressure against the pedal is relieved of the force of spring 41 which is readily noticeable by the driver or operator, and again at this predetermined point the operator knows that he has again reached the maximum of normal driving speed.

It is important for satisfactory results that the position of the head 36 and the degree of compression on the spring 41 be adjustable. Such adjustment may be made in the assembly shown in Fig. 1 as follows: If it is desired to increase the spacing of the head 36 from the pedal 10 the nut 33 is run farther on the thread end of the rod 32 until the said head is drawn downwardly to the desired position when the lock nut 42 is used to lock the rod 32 in the selected position. This drawing downwardly of the head 36 increases the compression on the spring 41 and means for controlling such compression is provided in the washers 35, one or more of which may be removed to decrease the compression of the spring 41. It will be understood that the head 36 may be moved to and retained in position closer to the pedal 10 by reversing the steps just described in reference to moving and retaining said head farther away from the pedal.

A modified form of the invention is illustrated in Fig. 3 wherein a spring 50 is completely enclosed with a housing 51. Said housing consists of an upper and a lower member 52 and 31a respectively. Lower member 31a, like 31 of Fig. 1, is a hollow flanged cylindical member open at one end and closed at the other with the open end terminating in outwardly turned flanges 39a. Member 31a is received in a hole 38a formed through the floor board 11, said flanges contacting the upper surface of the floor board and having screw holes which receive screws 37a whereby the member 31a is attached to the floor board as illustrated in the drawings. The member 31a may be composed of metal, or other suitable material, and its closed end has a center opening 40a therethrough which receives in slidable relation a rod 32a. The rod 32a projects downwardly through said hole 40a, the projecting end being threaded and having nuts 53 and 54 in threaded relation therewith. A spring 55 and a washer 56 are carried on the rod 32a between the nut 53 and the member 31a. The spring 50 is also carried by the rod 32a within the housing 31a. The upper member 52 of said housing 51 is a hollow cylindrical member with an open and a closed end with its open end retained within the lower member 31a with the walls of the said housing members telescoping and in reciprocably slidable relation. Said upper member may be composed of metal or of any other material found satisfactory. The closed end of the member 52 has an opening 57 formed therethrough. It will be seen by reference to Fig. 3 that the rod 32a extends longitudinally through the housing 51 and that the spring 50 is completely housed therein. Also that the rod 32a projects upwardly through the opening 57 a distance and terminates in a head portion 58. Also that said rod 32a is threaded adjacent said head and for a distance along the rod from head 58. A nut 59 is carried by said rod 32a adjacent to the housing member 52. It will now be seen that in this form of the invention that the coil spring 50 may have its compression within its housing adjusted or changed by tightening or loosening the nut 53, while the nut 54 is used as a lock nut, as will be readily understood. The spring 55 holds the nut 53 spaced apart from the housing member 31a while at the same time the spring 55 functions as a cushion between the nut 53 and the member 31a. As the member 31a is retained in a fixed position in relation to the floor board 11 it will be seen that the position of the nut 53 on the rod 32a controls the position of the head 58 in its spaced relation from the pedal 10 when the pedal is in its raised position at which position the gasoline throttle is restricted. It will also be seen that the nut 59 is a limit stop against which the housing member 52 contacts, said housing member 52 being retained in contact with said nut 59 by the spring 50. When the rod 32a of the invention becomes actuated by the pedal 10 being moved downwardly or upwardly in contact with the head 52 the housing member 52 moves downwardly or upwardly, as the case may be, in its telescoping relation with member 31a, and it will be seen that the contacting surfaces of the latter members affords a stable control guide for the rod 32a. Except for the structural features identified above the form of the invention illustrated in Fig. 3 is the same as that shown in Fig. 1 and in operation the forms of the invention shown in Figs. 1 and 3 are substantially the same.

Another modified form of the invention is shown in Fig. 4 wherein an additional spring 60 is associated with the pedal 10 by means of rod 61 pivotally attached to the top side of said pedal. The pivotal attachment may consist of a bossed portion 62 at the end of the pedal and a pivot pin 63 extending through a hole in the lower end of the rod 61 and the boss 62. The rod 61 extends upwardly from its attachment to the pedal and projects through a hole 64 formed in a foot 65 of a depending arm 66. The depending arm 66 is attached at its upper end to the dash board 67 of the automobile by means of a bolt 68 and a nut 69. The coiled spring 60 is mounted on the rod 61 with its lower end resting against the foot 65. The upper end of the rod 61 is threaded and carries a nut 70 which has an extended portion 71 against which the upper end of the spring 60 may seat. A lock nut 72 provides means for locking the nut 70 in a predetermined position on the upper threaded portion of the rod 61. It is to be noted by reference to Fig. 4 that when pedal 10 is in its upper position with the gasoline feed throttle restricted, which is the position illustrated in Fig. 4, that the portion 71 is spaced a predetermined distance above the top of the spring 60. As the pedal 10 is moved downwardly by a driver of the automobile upon which the mechanism embodying the invention is installed, the gasoline throttle is progressively opened until a certain amount of opening has been reached at which point the extension 71 contacts the spring 60 thereby suddenly requiring additional pressure on the pedal 10 to continue to open the said throttle. The amount of the opening of the throttle at the time the spring 60 becomes engaged may be such as to normally drive the automobile at a rate of thirty-five miles an hour. It will now be obvious from Fig. 4 and the discussion of Fig. 1 that any partial amount of opening of the throttle may be indicated to a driver by selecting a position for the nut 70 on the rod 61 and locking said nut in such position.

Another modified form of the invention is shown in Fig. 5 and 6 wherein is shown a spring 80 with lower legs 81 and 82, upper legs 83 and 84, coils 85 and 86, and cross bar 87 joining the ends of upper legs 83 and 84. The lower legs 81 and 82 are welded or otherwise attached to a plate 88, which plate has slots 89 and 90. Plate 88 is attached to the floor board 11 by means of screws 91 and 92. It is to be noted that the heads of the screws 91 and 92 are wider than the slots 89 and 90 and accordingly by loosening up the said screws that the plate 88 may be slid along the floor board 11 over a range equal to the length of the slots 89 and 90, minus, of course, twice the thickness of the screws just under the screw heads. It will also be seen by reference to Fig. 6 that the legs of said spring 80 are spaced apart so that the pedal 10 lies between the coils 85 and 86 and may pass downwardly between the said legs until the lower side of the pedal contacts the cross bar 87. The distance the cross bar 87 is below the pedal 10 may be changed by loosening the screws 91 and sliding the plate on the floor board 11 to a new position and then tightening the said screws to retain the spring 80 in fixed position. Thus, as in the forms of the invention previously discussed, the pedal 10 may be actuated over a predetermined distance and at a certain point of movement it engages or disengages, as the case may be, an additional spring resistance whereby a driver of an automobile will know that at that point the throttle controlling the feed of gasoline is open a predetermined amount.

It is to be understood that the invention contemplates, if found desirable, the use of successive spring involvement to indicate to the driver, various stages of opening of the throttle.

It will be seen that each of the forms of the invention affords an improved automobile speed control or speed warning mechanism. The present types of automobile speed governors now on the market have the disadvantage of permitting speeds only up to the desired safe or legal maximum driving speed, without any reserve for emergencies as for example when a sudden burst of speed might prevent a collision with moving automobiles or other moving objects. Furthermore, the ability to develop added power at times is necessary, as for example, when the automobile is climbing a hill. Under such conditions the ordinary governor throttles the engine to such an extent that it is necessary in many instances to throw the automobile into second gear for hill climbing. With the present invention, however, when climbing a hill it is only necessary to apply temporarily a much stronger pressure on the accelerator pedal to develop the power necessary for climbing the hill in high gear. Continuing the excessive pressure on the pedal when driving on the level would be impractical as the foot of the operator would very soon become fatigued whereupon the operator will release the pedal pressure to the lower driving range in which only light resilient reaction to pedal pressure occurs. Even if the operator willfully drives the automobile at excessive speeds he will do so with full knowledge and consciousness, having been warned at the stop provided for maximum light pedal pressure in the normal speed driving range, beyond which it is necessary for him to apply a much greater pedal pressure.

The invention has been illustrated in connection with several embodiments thereof. Other changes and modifications will occur to those familiar with the art, therefore, it is to be understood that the invention is not limited to the embodiments described but only by the prior art and the appended claims.

I claim:

1. In a device of the class described an accelerator pedal with a ball and socket joint bearing formed of rubber and as an integral part of said pedal, a rod actuated by said pedal and terminating at one end in a ball, said ball being adapted to cooperate with said bearing to joint said rod and pedal by a ball and socket, a spring continuously associated with said pedal, said spring being adapted to be compressed when the pedal is pressed downwardly and to move the pedal upwardly when downward pressure on the pedal is removed, an additional spring normally disconnected from said pedal but adapted to come into indirect association with the pedal when the pedal reaches a predetermined point in its downward travel, said additional spring being a coil spring and retained in position in a housing mounted in a hole through the floor board of an automobile in which the present device is mounted, said housing consisting of lower and upper hollow cylindrical members, each of said cylinders having one open and one closed end, the closed ends having a center hole formed therethrough, the said lower member terminating at its open end in outwardly turned flanges adapted to seat against the top surface of said floor board and to be fastened thereto, said upper member being associated with the lower member in slidable telescoping relation and being retained in such association by means of a rod extending longitudinally through said housing and said central holes, said rod having a pedal contact head portion on the rod projecting through the central hole of said upper member, said head being below and spaced apart from said pedal, said rod extending longitudinally through said coil spring within said housing, the projecting ends of said rod being threaded and having nuts threaded whereby the spacing of said head from the pedal may be adjusted, as can the compression on the said coil spring, a cushioning spring mounted on said projecting end of said rod, said cushioning spring being interposed between said housing and said nuts.

2. In a device of the class described an accelerator pedal, a spring continuously associated with said pedal, said spring being adapted to be compressed when the pedal is pressed downwardly and to move the pedal upwardly when downward pressure on the pedal is removed, an additional spring normally disconnected from said pedal but adapted to come into indirect association with the pedal when the pedal reaches a predetermined point in its downward travel, said additional spring being retained in position in a housing mounted in a hole through the floor board of an automobile in which the present device is mounted, said housing consisting of lower and upper hollow cylindrical members, each of said cylinders having one open and one closed end, the closed ends having a center hole formed therethrough, the said lower member terminating at its open end in outwardly turned flanges adapted to seat against the top surface of said floor board and to be fastened thereto, said upper member being associated with the lower member in slidable telescoping relation and being retained in such association by means of a rod extending longitudinally through said housing and said central holes and projecting beyond said closed ends, said rod having a pedal contact head portion on the rod end projecting through the central hole of said upper member, said head being below and spaced apart from said pedal, the projecting ends of said rod being threaded and having nuts threaded thereon whereby the spacing of said head from the pedal may be adjusted, a cushioning spring mounted on the end of the rod projecting through the closed end of the lower member said cushioning spring being interposed between said lower member, and said nuts threaded on the end of the rod which projects through the closed end of said lower member.

3. In a device of the class described an accelerator pedal, a spring continuously associated with said pedal, an additional spring normally disconnected from said pedal but adapted to come into indirect association with the pedal when the pedal reaches a predetermined point in its downward travel, said additional spring being a coil spring and retained in position in a housing mounted in a hole through the floor board of an automobile in which the present device is mounted, said housing consisting of lower and upper hollow cylindrical members, said upper member being associated with the lower member in slidable telescoping relation and being retained in such association by means of a rod extending longitudinally through said housing and projecting a distance through and beyond central holes formed in each end thereof, said rod having a pedal contact head portion on the rod projecting through said central hole of said upper member, said head being below and spaced apart from said pedal, said rod extending longitudinally through said coil spring within said housing, the projecting ends of said rod being threaded and having nuts threaded thereon, a cushioning spring mounted on said end of said rod projecting beyond the end of said lower member, said cushioning spring being interposed between said housing and said nuts threaded on the end of the rod projecting through the closed end of said lower member.

LOUIS JOSEPH VANKE.